United States Patent [19]

Peck et al.

[11] 4,338,016

[45] Jul. 6, 1982

[54] DIFFUSION-TRANSFER PROCESSOR

[75] Inventors: Gene E. Peck, Sun Valley; Bruce Cooperberg, North Hollywood, both of Calif.

[73] Assignee: Insta-Print, Incorporated, North Hollywood, Calif.

[21] Appl. No.: 278,723

[22] Filed: Jun. 29, 1981

[51] Int. Cl.[3] .................................................. G03B 9/00

[52] U.S. Cl. ...................................... 354/303; 354/305; 354/319

[58] Field of Search ............... 354/301, 303, 305, 317, 354/318, 319

[56] References Cited

U.S. PATENT DOCUMENTS 3,033,095 5/1962 Limberger .......................... 354/301

4,266,866 5/1981 Dodge et al. ....................... 354/301

*Primary Examiner*—L. T. Hix

*Assistant Examiner*—Alan Mathews

*Attorney, Agent, or Firm*—Francis X. LoJacono

[57] ABSTRACT

An improved diffusion-transfer processor for photomechanical reproduction of artwork and like mediums of the type using one negative and one receiver that are passed through a chemical solution to provide a single finished print. The processor comprises a first set of rollers to transport the negative through a continuous flow of chemical solution and into the second set of rollers, the second set of rollers being positioned to simultaneously accept both the negative and the receiver so as to bring them in direct contact, whereby the image of the negative is transferred to the receiver. The negative and the receiver may be of any length that is equal to or greater than the distance between the first and second sets of rollers.

15 Claims, 8 Drawing Figures

FIG. 1
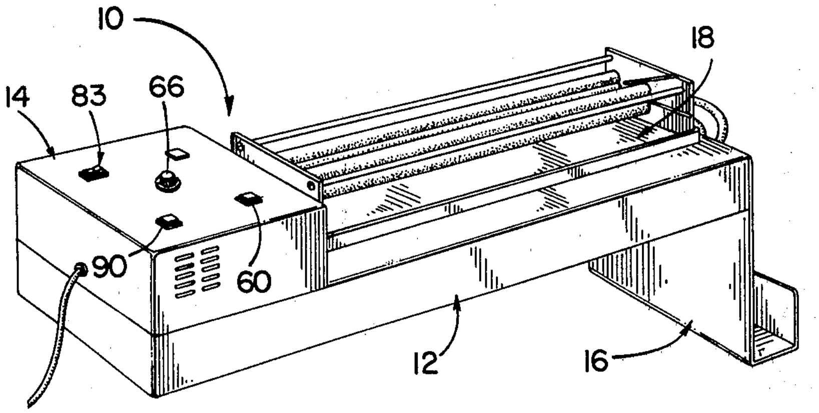
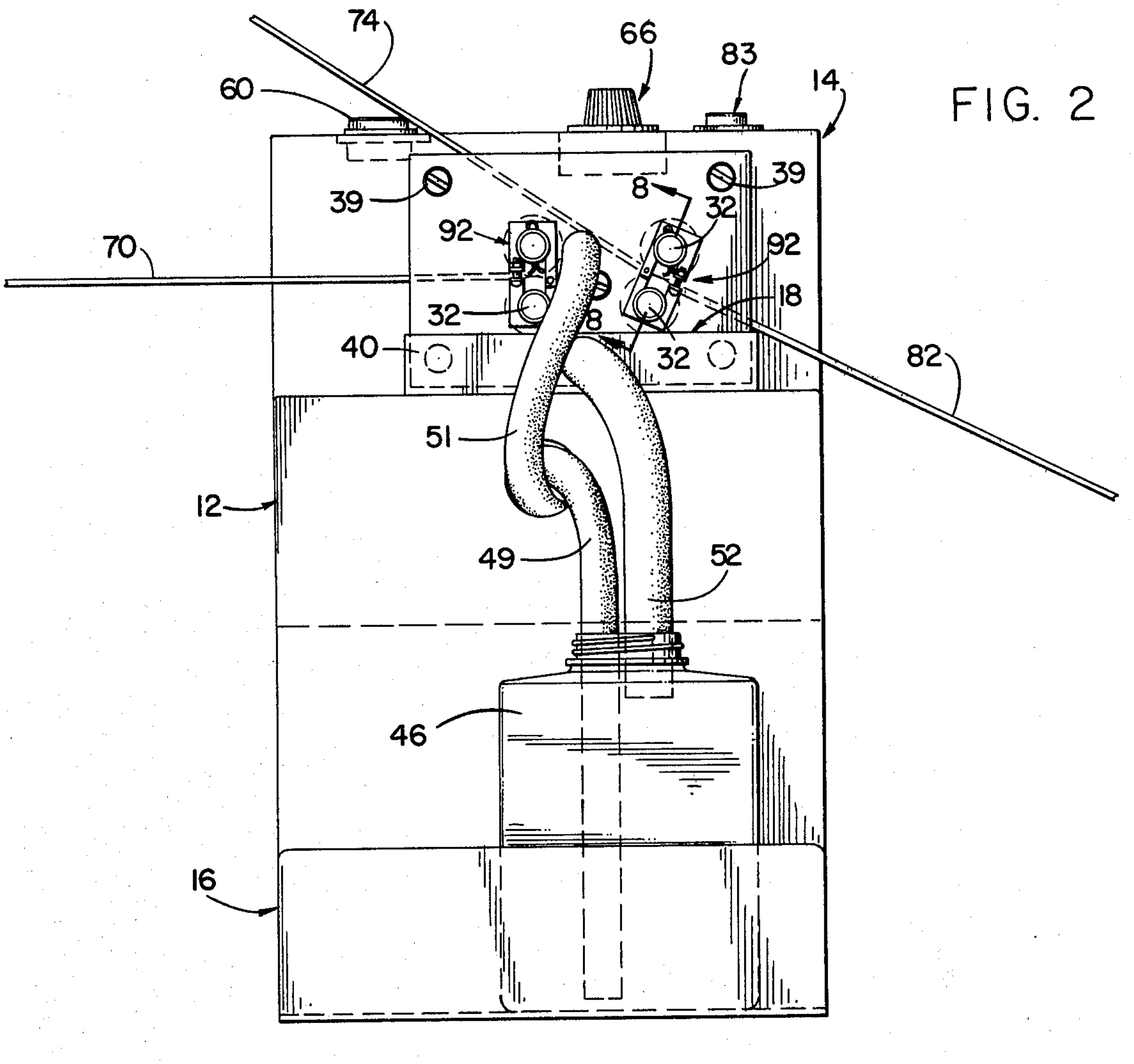
FIG. 2

DIFFUSION-TRANSFER PROCESSOR

BACKGROUND OF THE INVENTION

1. Field of the Invention

This invention relates generally to a diffusion-transfer processor, and more particularly to a diffusion-transfer-type apparatus that uses one negative and one receiver, the end result being one finished print.

2. Description of the Prior Art

The diffusion-transfer process, also known as the photomechanical-transfer process, is a method to photograph copy and transfer the image thereof directly to a member, generally referred to as a carrier. The typical method used in graphic arts is to make a film negative of a subject (copy), then develop the negative and expose the negative film to a photosensitive paper, film or printing plate. This process is well known in the art, and has been well established for many years. However, with the advent of the photomechanical-transfer process, the above-mentioned method has become somewhat obsolete.

The diffusion-transfer process now allows an individual to begin with a positive image, make one exposure, and finish with a single positive image. This is accomplished by providing an exposed negative paper and transferring the image directly to a receiver paper, film, or printing plate. This method has provided many advantages—mainly, eliminating the negative together with the exposing and the developing of the final print, which is generally referred to as a carrier. Thus, the operation of making a finished carrier is much easier and faster, and it further improves the quality of the finished image. The overall cost is also considerably reduced in comparison with that of the old method used in graphic arts.

However, it is well known in the art that the various diffusion-transfer processors have their own limitations and restrictions. One problem is that the negative and receiver must be at least six inches long, so as to pass through the solution tank. Also, because the negative and receiver are very often aligned prior to being subjected to the chemical solution, sometimes the solution does not fully react to the coated opposing sides for a proper transfer of the image.

It will be apparent from the foregoing that the present apparatus overcomes the above-mentioned problems as well as others not herein recited.

SUMMARY OF THE INVENTION

The present invention has for an important object to overcome the existing problems and restrictions inherent in known diffusion-transfer processors. The processor of the present apparatus comprises a first set of rollers adapted to accept and transport a negative paper through a continuous flow of chemical solution (activator), and into a second set of rearwardly disposed rollers. The receiver paper is simultaneously fed into the second set of rollers, so as to be brought into direct contact with the negative paper. Each set of rollers is provided with its own drive unit, the drive unit for the second set of rollers being adjustable so that the starting thereof can be timed to allow the negative paper and receiver paper to exit the rollers together in the proper set alignment with respect to each other.

It is another object of the invention to provide two sets of rolles that are spaced apart in a given relationship, whereby small pieces of negatives and receiver papers can be readily utilized—this not being the case with existing processors.

Still a further object of the invention is to provide a processor of this character which includes a continuous flow of an activator solution that is pumped through a pumping system, and is discharged directly between the opposing coated sides of the negative and receiver papers, the solution being caught in a return tray to allow the solution to return to a holding tank or reservoir. This arrangement allows the activator solution to cover the entire surface of the coated sides before they are brought into contact with each other, since they are sandwiched together by the rear set of rollers.

It is a further object of the invention to provide an apparatus of this character that includes relatively few operating parts, and yet provide a more reliable working unit.

It is still another object of the invention to provide an apparatus of this character that is easy to service and maintain.

Still another object of the present invention is to provide a diffusion-transfer apparatus that is relatively inexpensive to manufacture, but simple and rugged in construction.

The characteristics and advantages of the invention are further sufficiently referred to in connection with the accompanying drawings, which represent one embodiment. After considering this example, skilled persons will understand that variations may be made without departing from the principles disclosed; and we contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 1 is a perspective view of the present invention;

FIG. 2 is an enlarged end-elevational view, showing the location of the two insert trays and the discharge tray;

DESCRIPTION OF THE PREFERRED EMBODIMENT

Referring more particularly to the drawings, there is shown a diffusion-transfer processor, generally indicated at 10, the processor being also known as a photomechanical-transfer processor which uses a method to photograph copy and transfer the image directly to another carrier. The basic materials used in preparing camera-ready copy consists of (1) a light-sensitive negative paper, (2) a chemically sensitive paper or transparent film, (3) a ready-mixed processing fluid, which will be hereinafter referred to as the "activator solution," and (4) a processor.

As an example, a light-sensitive negative paper is exposed to the copy, by using a process camera or a contact-printing frame, after which the negative paper is brought into emulsion-to-emulsion contact with a chemically sensitive receiver paper or film, the activator solution being applied to the coated surface of the negative paper and the receiver paper or film.

Since there are several light-sensitive negative mediums, the term "negative paper" will be hereinafter used. Accordingly, there are various chemically sensitive receivers; and thus, for simplicity, the term "receiver paper" will be used to include all receiver mediums.

The diffusion-transfer apparatus 10 as herein illustrated comprises a frame structure defining an elongated housing 12 adapted to be supported on a table or like structure, and having a control box, designated at 14, mounted at one end and a reservoir or tank-support brackets 16 at the opposite end—the diffusion-transfer-bath assembly, generally indicated at 18, being mounted on housing 12 adjacent the control box 14.

Figures 3, 4, 7, 8:
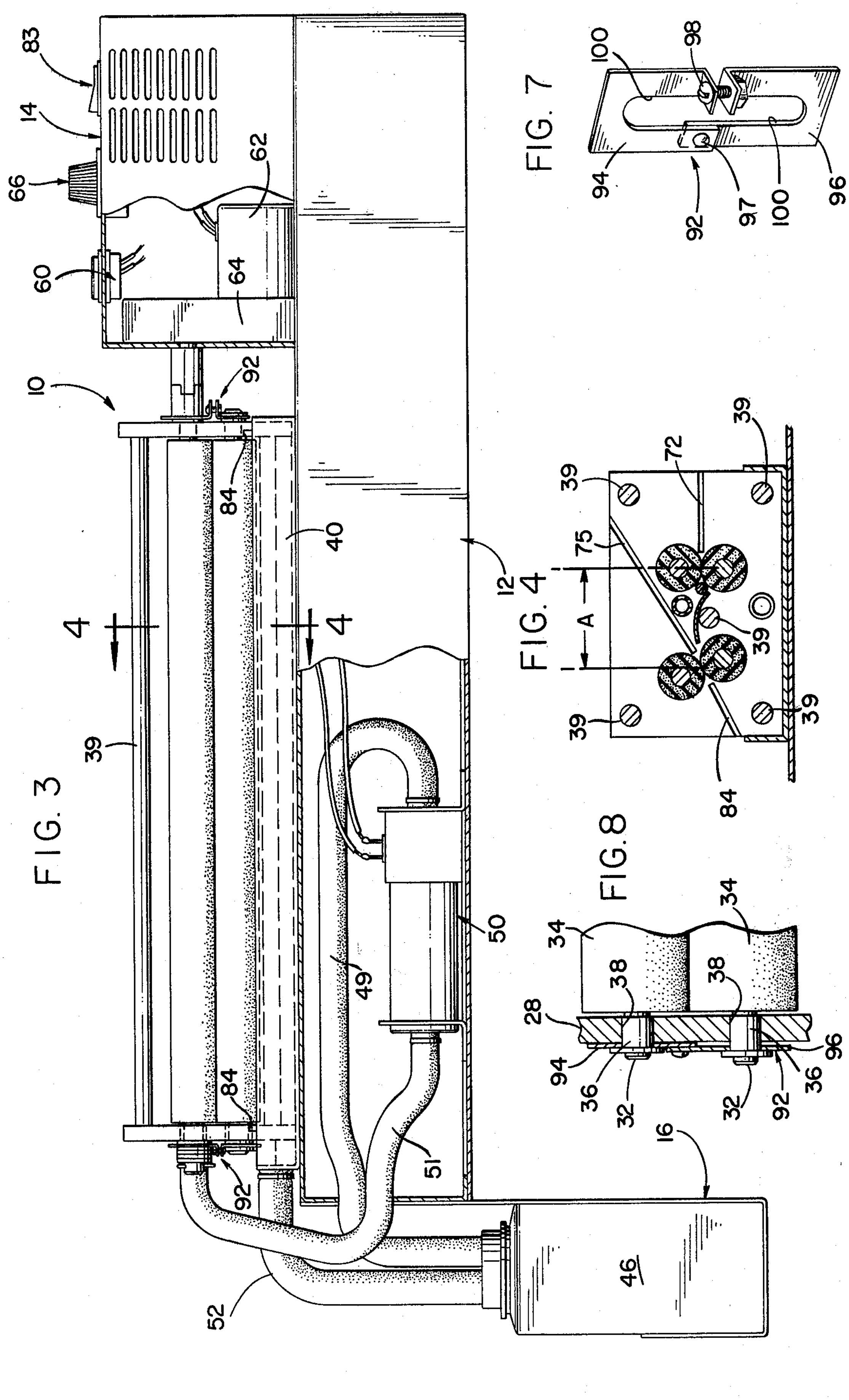
FIG. 3 is a side-elevational view with portions thereof broken away to show the location of the pump means and motors for driving the rollers.
FIG. 4 is a cross-sectional view taken substantially along line 4—4 of FIG. 3, without the trays therein.
FIG. 7 is a perspective view of the roller-pressure adjusting means.
FIG. 8 is an enlarged cross-sectional view taken substantially along line 7—7 in FIG. 2.
Figure 5:
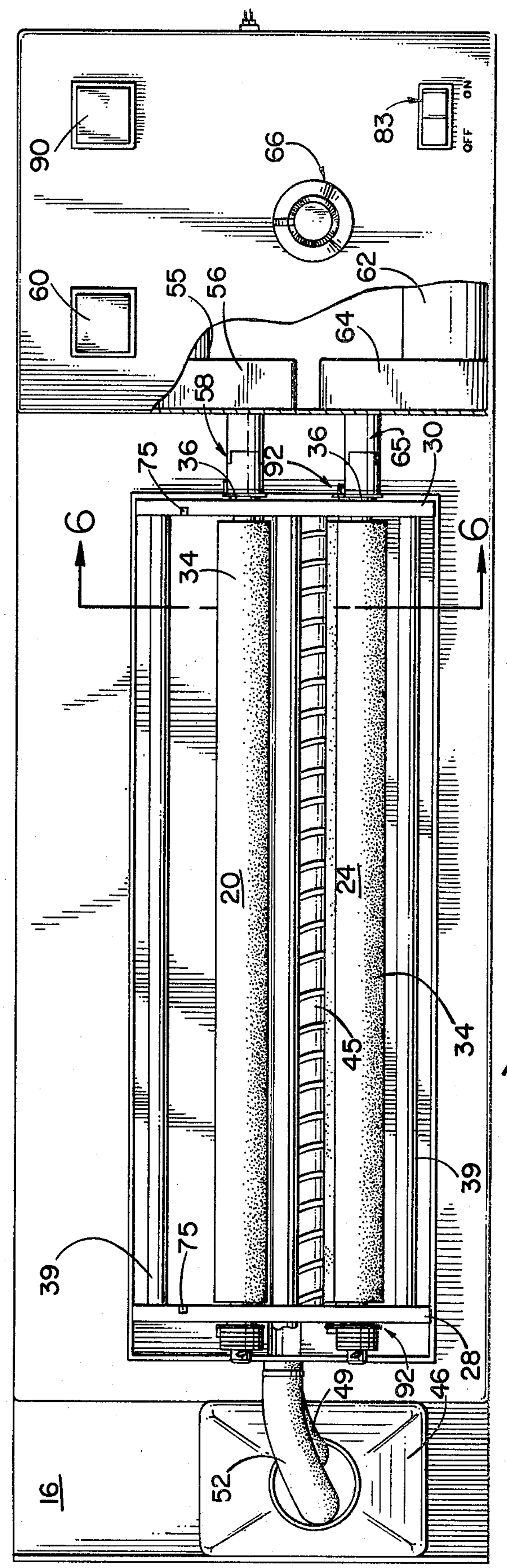
FIG. 5 is an enlarged top-plan view with a portion of the motor housing broken away.
Figure 6:
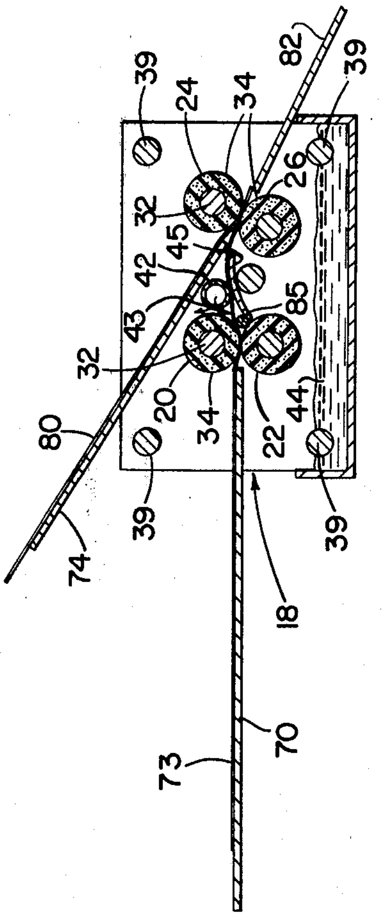
FIG. 6 is a cross-sectional view taken substantially along line 6—6 of FIG. 5, and including the insert and discharge trays.

The diffusion-transfer-bath assembly comprises a first set of rollers 20 and 22, which will also be referred to as the "lead rollers," and a second set of rollers 24 and 26, which will be referred to as the "rear rollers." Each set of rollers is arranged longitudinally along housing 12 and is rotatably supported by free-standing end walls 28 and 30, each roller being formed having a central core or shaft 32 which is covered by a resilient annular cover 34, such as a soft plastic or rubber. The shafts 32 extend outwardly so as to be received in pliable bushings 36, which are fitted into respective openings 38. Lead rollers 20 and 22 are aligned in a vertical relationship; while the rear rollers 24 and 26 are angularly aligned. That is, roller 24 is offset rearwardly from lower roller 26, as seen in FIGS. 4 and 6. Thus, the respective pairs of rollers are held in engaging parallel positions between end walls 28 and 30 by a plurality of longitudinal connecting bars 39.

In order to establish a means to bathe the various papers as they are fed through the diffusion-transfer-bath assembly, there is included a bath tray 40 which is adapted to receive the above-described roller structure therein. That is, the bath means comprises a liquid-dispensing means defined by an elongated tubular member 42 having at least one longitudinal slot 43 formed therein, so as to discharge an activator solution 44 continuously as the papers are passing from one set of rollers to the other. The tubular member is positioned just aft of the lead rollers and adjacent the upper roller 20, the slot 43 facing roller 20 to allow the activator solution to bathe the coated surface of the paper as it passes through rollers 20 and 22. The specific operation thereof will be hereinafter described.

Positioned below the discharge tubular member 42 is an elongated longitudinally disposed paper-guide member 45 arranged to support the negative paper as it passes between the lead rollers and the rear rollers, as seen in FIG. 6.

The activator solution 44 is generally stored in a reservoir or tank 46 which is shown mounted in support bracket 16. It should be noted that reservoir 46 can be located at any given area remotely from the assembly, if required, since the reservoir is connected by a first hose 49 to a pump means 50 which is shown located in housing 12. (See FIG. 3). The activator solution 44 is pumped from reservoir 46 through lines 49 and 51, line 51 being connected at one end to the output side of pump means 50, and at the opposite end to tubular member 42—the solution being caught in tray 40 and returned to reservoir 46 by hose line 52, whereby a continuous flow is provided during the operation of the processor.

Accordingly, the processor includes a drive means for rotating each set of paired rollers, wherein the drive means comprises preferably two separate drive systems. The first drive system comprises a motor 55 having a reduction-gear box 56 interconnected to roller 20 by a universal coupling 58. As roller 20 rotates, it frictionally rotates roller 22. These rollers are adapted to rotate at a given speed and are operated by a start switch 60. The second drive system comprises a motor 62 having a similar gear-reduction box 64 interconnected to the upper rear roller 24 by a universal coupling 65—roller 24 thus frictionally engaging roller 26, so that the rollers rotate together. However, this set of rollers is activated by a timing-switch means 66, whereby motor 62 operates at a selected time after the lead rollers are activated.

OPERATION

In order to operate the diffusion-transfer processor, a first input tray 70 is positioned in front of the lead rollers 20 and 22, the tray being horizontally located in horizontal slots 72 formed in each wall 28 and 30. Thus, a negative paper 73 is positioned thereon with the emulsion side up. A second input tray 74 is angularly positioned in angular slots 75, also formed in end walls 28 and 30, whereby tray 74 terminates in front of rear rollers 24 and 26. The tray is positioned in order to be adapted to receive the receiver paper 80 with the emulsion side facing downwardly. The receiver paper 80 is then positioned between rollers 24 and 26, as seen in FIG. 6. A third tray is provided defining an output tray 82, and is angularly positioned rearwardly of rear rollers 24 and 26—tray 82 being held in place by angularly disposed slots 84.

Once the three trays are in position, the prime ON/-OFF switch 83 is actuated to ON, whereby the activator solution 44 is pumped through tubular member 42, thus flooding the area above guide member 45—whereby the solution will flow around and over the guide member 45. To insure a large enough flow of solution in a rearward direction so as to contact receiver paper 80, a barrier means (such as rod 85) is positioned adjacent to or in contact with roller 22 between the roller and guide member 45.

Prior to pressing the starter switch 60, the timing-switch means 66 should be adjusted in accordance with the overlay position of the two papers as they pass between the rear rollers. Thus, depending upon the receiver medium and the negative medium, the placement of the two papers might require a particular adjustment so that they contact each other in the proper transfer position. Accordingly, after the timing means 66 is set, the starter switch is pressed—causing negative paper 73 to be pulled between rotating rollers 20 and 22. As the negative paper 73 reaches a selected point between the two sets of rollers, the timing-switch means 66 causes rear rollers 24 and 26 to rotate—thus pulling receiver paper 80 between the rollers as the negative paper also engages the rear rollers. The two papers are pressed together, thus making a positive contact between the opposing coated surfaces and, at the same time, squeezing the excess solution out between the papers. The two papers then exit from the rear rollers onto output tray 82. After a given waiting period, the negative paper is stripped from the receiver paper, thereby completing the diffusion transfer.

It is important to note that the distance between the contacting points of the rollers, indicated by "A," will determine the minimum size of paper that can be used in the process. Hence, the shorter the distance between "A," the shorter the length of paper. That is, it is now possible to transfer an image using paper having only a two-inch length, which was not previously possible.

The timing-switch means 66 also includes means to stop the rotation of both sets of rollers at a given time after the starter button is pressed. This prevents the rollers from continuously rotating.

However, when numerous transfers are required employing the same negative and receiver paper for repeat prints, there is provided a reset means 90 which is adapted to stop both motors 55 and 62, and thus stop the rotation of each set of rollers. At this time, another negative paper 73 is positioned on tray 70 and another receiver paper is positioned on tray 74. The starter switch is again activated, causing the sequential operation of the rollers. Accordingly, as long as the same negative is used with the same size receiver paper, the timing switch remains in its original position. If different papers are used so that they must be aligned together as they engage the second set of rollers, then the timing switch 66 is readjusted to prevent misalignment of the two papers as they are brought into face-to-face contact with each other.

Each set of rollers includes means 92 for adjusting the engaging pressure between the respective rollers. The adjusting means is attached to the ends of the respective rollers (seen in FIGS. 2 and 8) and comprises a pair of keeper members 94 and 96, which are pivotally linked by pin 97 and an adjusting screw 98. Each keeper member includes an aligned slot 100, in which the respective bushings 36 are received, as seen in FIG. 8. By adjusting screw 98, the pressure between the respective rollers can be changed to accommodate the various changes in the paper thicknesses, whereby the roller will not slip when engaging the paper or papers. The second set of rollers, in particular, must be under enough pressure to squeeze the excess activator solution from between the contacting negative and receiver papers.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and we do not wish to be restricted to the specific form shown or uses mentioned, except as defined in the accompanying claims.

We claim:

1. An improved diffusion-transfer processor for photomechanical reproduction of artwork and like mediums, comprising:

- a first pair of rollers positioned in parallel engagement with each other, and adapted to receive a negative paper;
- a second pair of rollers positioned in parallel engagement with each other, and spaced rearwardly of said first pair of rollers, said second pair of rollers being adapted to receive said negative paper and a receiver paper simultaneously therebetween;
- means for continuously supplying an activator solution so as to bathe said negative and receiver papers in said activator solution, prior to said papers passing between said second pair of rollers;
- a first drive means coupled to at least one of said rollers of said first pair of rollers;
- a second drive means coupled to at least one of said rollers of said second pair of rollers; and
- means connected to said second drive means to control the starting time of said second drive means relative to the starting of said first drive means, whereby said negative and said receiver papers will engage in a selected alignment with each other.

2. A diffusion-transfer processor as recited in claim 1, including:

- a pair of oppositely disposed end walls spaced apart and adapted to rotatably support each of said pairs of rollers;
- a bath tray positioned under said rollers to catch said activator solution;
- and wherein said means for continuously supplying said activator solution comprises:
- a pump means;
- a discharge member connected to said pump means and interposed between said first and second pairs of rollers, said discharge member having at least one discharge opening to allow said solution to bathe said negative and receiver papers in the space between said first and second pair of rollers; and
- a reservoir communicating with said bath tray to receive said activator solution therefrom, and adapted to supply said activator solution to said pump, whereby said activator solution is pumped continuously in a closed system.

3. A diffusion-transfer processor as recited in claim 2, including:

- a first input tray positioned in front of said first pair of rollers, to support said negative paper thereon;
- a second input tray positioned in front of said second pair of rollers, to support said receiver paper thereon; and
- an output tray positioned rearwardly of said second pair of rollers, said trays being removably supported by said end walls.

4. A diffusion-transfer processor as recited in claim 3, including guide means interposed between said first and second pairs of rollers, and positioned below said discharge member, whereby said negative paper passing between said first pair of rollers is guided into said second pair of rollers.

5. A diffusion-transfer processor as recited in claim 4, wherein said second input tray is angularly positioned above said first input tray, whereby said receiver paper from said second input tray is inserted into said second pair of rollers together with said negative paper from said first input tray, whereby said solution contacts said papers prior to being pressed between said second pair of rollers.

6. A diffusion-transfer processor as recited in claim 5, including means for selectively operating said second pair of rollers, to selectively position said receiver paper in alignment with said negative paper, whereby said papers are pressed together in proper relationship to each other.

7. A diffusion-transfer processor as recited in claim 4, including means to cause flooding of said space between said first and second pairs of rollers, and above said guide means.

8. A diffusion-transfer process as recited in claim 6, including:

an ON/OFF switch to energize said processor; and a starter switch to operate said drive means after said ON/OFF switch is activated;

and wherein said selective operating means operates in conjunction with said starter switch.

9. A diffusion-transfer processor as recited in claim 6, wherein said first pair of rollers are vertically aligned with each other, and wherein said second pair of rollers are angularly disposed to each other.

10. A diffusion-transfer processor as recited in claim 8, wherein each of said rollers comprises a central shaft adapted to extend outwardly from said end walls, and having a resilient annular cover.

11. A diffusion-transfer processor as recited in claim 10, wherein said end walls include pliable bushings adapted to receive said ends of said central shafts, and means for adjusting the pressure between the respective rollers of each pair of rollers, said pressure-adjusting means being mounted to said respective bushings of said rollers.

12. A diffusion-transfer processor as recited in claim 2, including:

an elongated housing wherein said pump means is mounted;

a control box mounted at one end of said housing; and a reservoir-support bracket attached to the opposite end of said housing;

a first hose interconnecting said pump with said discharge member;

a second hose interconnecting said pump with said reservoir; and a third hose interconnecting said bath tray with said reservoir.

13. A diffusion-transfer processor as recited in claim 12, including:

a first substantially horizontal input tray positioned in front of said first pair of rollers, to support said negative paper;

a second angularly disposed input tray positioned above said pair of rollers and aligned with said second pair of rollers, to feed said receiver paper between said second pair of rollers, whereby said negative and receiver papers are brought into contact with each other as they pass together between said second pair of rollers.

14. A diffusion-transfer processor as recited in claim 13, wherein the distance between said first and second pairs of rollers determines the minimum length of the negative and receiver papers, said minimum length being approximately two inches.

15. A diffusion-transfer processor as recited in claim 2, wherein said negative and said receiver may be of any length that is equal to or greater than the distance between said first and second pairs of rollers.

* * * * *